United States Patent [19]

Pierrat

[11] 4,117,746
[45] Oct. 3, 1978

[54] ORBITAL DRIVE MECHANISM
[75] Inventor: Michel A. Pierrat, Andover, Mass.
[73] Assignee: Compudrive Corporation, Medford, Mass.
[21] Appl. No.: 736,899
[22] Filed: Oct. 29, 1976
[51] Int. Cl.[2] .............................................. F16H 1/28
[52] U.S. Cl. ...................................... 74/805; 74/804
[58] Field of Search ................................... 74/804, 805

[56] References Cited
U.S. PATENT DOCUMENTS

| Re. 24,288 | 3/1957 | Nanni | 74/805 |
|---|---|---|---|
| 3,056,315 | 10/1962 | Mros | 74/805 |
| 3,073,184 | 1/1963 | Braren | 74/804 |
| 3,192,799 | 6/1965 | Pamplin | 74/805 |
| 3,985,047 | 10/1976 | Therkelsen | 74/805 |
| 3,998,112 | 12/1976 | Pierrat | 74/805 |
| 4,023,440 | 5/1977 | Kennington | 74/805 |

FOREIGN PATENT DOCUMENTS 542,206  10/1929  Fed. Rep. of Germany ............. 74/804

Primary Examiner—Benjamin W. Wyche
Assistant Examiner—R. C. Turner
Attorney, Agent, or Firm—Cesari and McKenna

[57] ABSTRACT

In a compact high-torque mechanical speed changer of the type in which different relative speeds may be realized through substitution of different cooperating planet and sun gear components one of which has teeth in the form of lobes of continuous substantially epitrochoid curvature and the other of which has circularly-curved teeth differing in number by one, orbiting motions associated with angular movements are resolved and angular motions are developed about a non-orbiting axis by way of a unique "zero-velocity" transmission plate having peripheral circular-sided openings cooperating with an array of circular pins, rollers or the like. The lobed gear and the transmission plate are advantageously fixed together for orbital motion in response to rotation of a shaft eccentric, and are of about the same diameter, and their cooperating toothed companions are preferably of the type involving discrete roller-pin teeth, and are of the same diameter. These cooperating sets are substantially identical in important dimensional respects, and portions can therefore be changed to effect different speed ratios, with the same counterweighting serving to offset eccentricities. The changer housing and interior mountings for gear combinations accommodate different sets, as desired, to yield various relative speeds of the relatively-rotatable parts, and the transmission plate orbiting component may advantageously be replaced by a lobed component to extend the range of speed ratios which are available from one basic size of speed changer.

9 Claims, 5 Drawing Figures

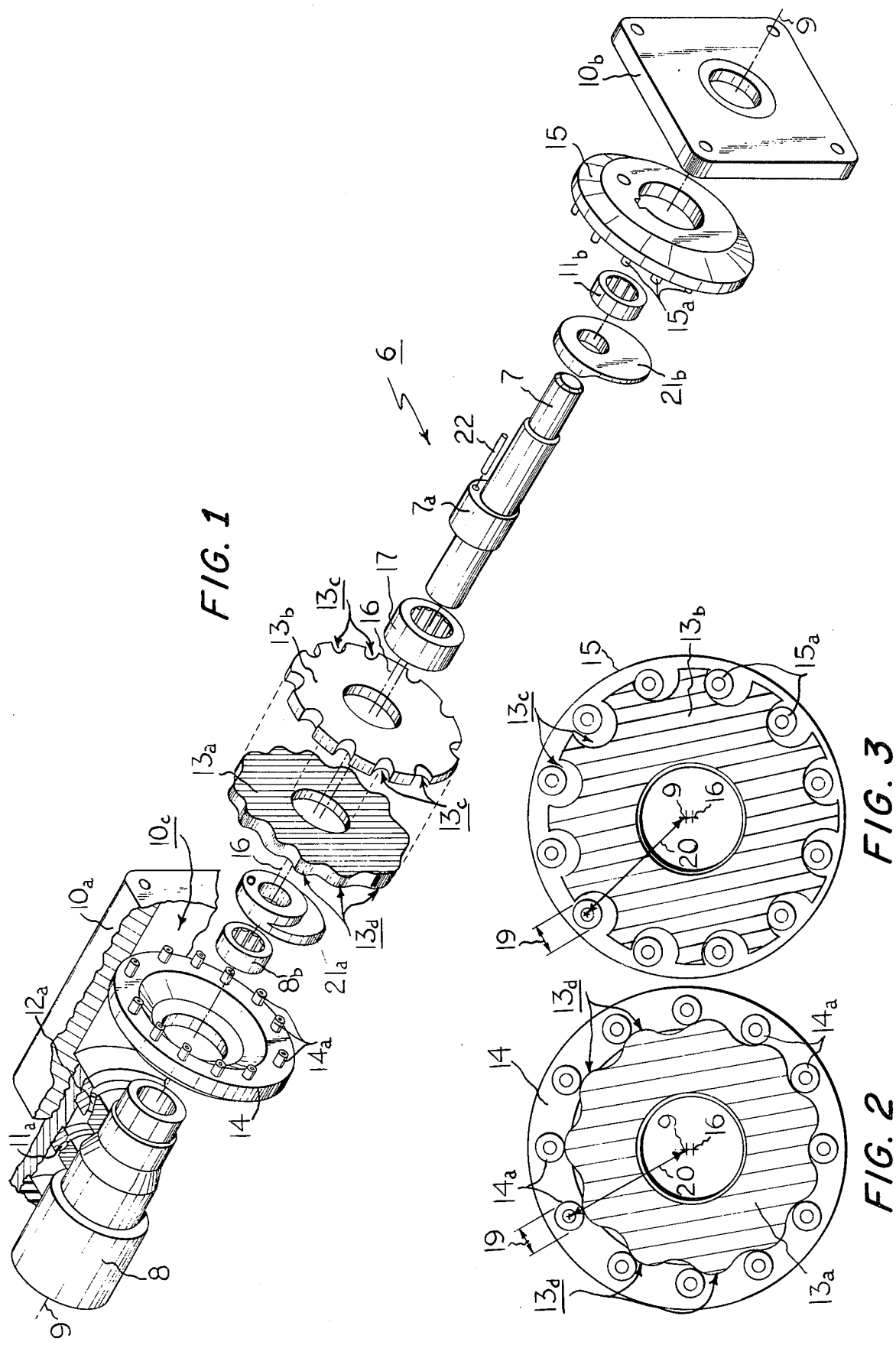

ORBITAL DRIVE MECHANISM

BACKGROUND OF THE INVENTION

Speed-changing mechanisms of a variety of types have long been well known. Those with which the present invention is concerned are of a class in which special forms of "gearing" are preferably exploited to promote transmissions of power while involving relatively small bulk, and but few parts which desirably move at relatively slow speeds. The "gearing" preferred for such purposes comprises paired internally-toothed "sun" and externally-toothed "planet" gears in which substantially continuous rolling contacts occur between many teeth which are simultaneously in torque-transmitting engagements. So-called "geroter" gears have such characteristics, and are described in U.S. Pat. No. 1,682,563 - Hill, for example, where the interior gear has one less tooth than the exterior gear surrounding it. One such pair of gears has been described in the context of speed reduction and reversal, in U.S. Pat. No. 3,304,808 - Grant. In another speed reducer, U.S. Pat. No. 2,874,594 - Sundt, two sets or pairs or undulating-toothed gears are employed, with balls or rollers interposed between them, and with the "gears" being of different diameters. The latter fact, involving gear diameters which are different for the plural sets, represents a difficulty in relation to purposes of the present invention, and is found to be a characteristic of conventional forms of spur gearing, where different speed ratios are to be realized within the framework of like torque-transmitting capabilities. Spur gearing arrangements otherwise having some features of background pertinence to the disclosures here are believed to appear in U.S. Pat. No. 2,108,384 - Moisy, and U.S. Pat. No. 3,056,315 - Mros, and U.S. Pat. No. 3,429,393 - Lorence, and U.S. Pat. No. 2,667,089 - Gregory, and U.S. Pat. No. 3,144,791, and U.S. Pat. No. 3,783,712 - Colinet, and U.S. Pat. No. 1,770,035 - Heap et al., and U.S. Pat. No. 2,250,259 - Foote, Jr., and U.S. Pat. No. Re.24,288 - Nanni, and U.S. Pat. No. 3,192,799 - Pamplin, and U.S. Pat. 3,383,931 - Patterson, Jr. Further, my own U.S. Pat. No. 3,574,489 discloses certain orbital drives in which the gearing is of configurations akin to those preferred for the present purposes.

A form of hitherto-known gearing which lends itself especially well to uses in the mechanical drives of this invention includes an internal planet gear having "cycloidal" shape teeth or lobes of epitrochoid curvature cooperating with a surrounding external sun gear wherein the teeth are in the form of cylindrical pins or rollers and exceed by one the number of teeth of the planet gear. My U.S. Pat. No. 3,998,112, discloses improved and advantageous drives in which such gearing sets are interchangeable to make possible the production of a line of like devices which feature many and widely-different speed ratios. Such results are there promoted through application of at least two sun-and-planet gear sets wherein the interchangeable planet gears have the same diameter and the same mass eccentricities, and thus remain matched with counterweighting despite their different numbers of teeth, and wherein the cooperating sun gears are likewise all of the same diameter and have their teeth conveniently disposed at one predetermined radial distance from a central axis. There are certain speed ranges which may instead be served by single-stage speed changer, involving but a single sun-and-planet gear set; however, one then encounters the problem of developing controlled interactions between an orbiting "gear" and a relatively-fixed structure. For such reasons, the aforementioned U.S. Pats. Nos. 3,304,808 and 1,770,035 and 3,383,931 show the uses of circular arrays of critically-dimensioned and critically-disposed circular holes in orbiting gears, those holes being in surrounding mated relationship with smaller-diameter cylindrical pins and cooperating with them to effect desired motion translations. The present invention intentionally avoids the use of through-hole arrays, and, instead, uniquely employs a circular transmission-plate or cam which has open circular-sided depressions about its periphery cooperating with smaller cylindrical pins or rollers; such a transmission-plate or cam may advantageously be substituted for a lobed cam as employed in the devices disclosed in my aforesaid Patent.

SUMMARY

A preferred orbital drive mechanism in accordance with the present teachings comprises a separable housing in which in-line rotatable input and output shafts are journalled, and in which the input shaft is provided with an eccentric shoulder imparting a crankshaft characteristic for its support of a relatively-rotatable planet gear of predetermined diameter, the lobe-like teeth of said gear following a substantially continuous epitrochoid curvature and being in cooperative engagement with a first circular sun-gear array of rollers pinned to a disk of predetermined diameter which is fixed with the housing coaxially with the central axis of the input shaft. Also mounted on the same eccentric shoulder is a second planet member, which is to serve as a "transmission" plate or cam, the planet gear and transmission plate being angularly coupled for rotation together about a common eccentric axis, and preferably being integral with one another and of substantially the same outer diameter. A counterweight, offsetting the rotational imbalances of the eccentrically-disposed planet gear and transmission plate, is locked with the input shaft, and will serve correctively not only for those planet members but also for substitute members of similar dimensions but differing numbers of teeth, or for pairs of lobed planet gears which do not involve transmission plates or cams. About the circular periphery of the transmission plate there are a plurality of open depressions each preferably in the form of an arc of a circle and having the general shape of a circular segment. Those depressions are disposed for cooperative mating engagements with a second circular array of rollers, generally like the first, but pinned with a second disk which is angularly coupled in driving relationship with the coaxial output shaft.

In an alternate arrangement, the second array of rollers may be relatively fixed, angularly, in relation to the housing, with the first array of rollers being angularly coupled with an output shaft. Differential actions may be developed by rotating appropriate ones of the two shafts or housing, or the housing may be rotated or allowed to rotate while either or both of the shafts is rotated or allowed to rotate, in special-purposes applications of the mechanism.

Accordingly, it is one of the objects of the present invention to provide novel and improved orbital drive mechanisms, for speed reductions and the like, which offer an extended range of speed-changing capabilities through use of but relatively few parts which are advantageously interchangeable with other useful speed-changer parts and which form a compact assembly.

Another object is to provide a unique and uncomplicated single-stage orbital drive mechanism lending itself to low-cost manufacture and ready assembly into embodiments yielding relatively low speed-change ratios, and which has dimensional and counter-balancing characteristics comparable to those of a two-stage orbital drive mechanism.

A yet further object is to provide a unique orbital to non-orbital coupling, useful either as a zero-velocity coupling or as an angular-motion translator, in which pin or roller members cooperate with open indentations of substantially circular-segment form about the circular periphery of a transmission member.

BRIEF DESCRIPTION OF THE DRAWINGS

Although the aspects and features of this invention which are considered to be novel are expressed in the appended claims, further details as to preferred practices and as to the further objects and features thereof may be most readily comprehended through reference to the following description of preferred embodiments taken in connection with the accompanying drawings, wherein:

FIG. 1 portrays principal components of an improved single-stage speed-reducing mechanical drive in an exploded relationship, with a main housing part being shown as a cross-sectioned fragment for purposes of clarity;

FIG. 2 provides a plan view of a sun-and-planet gear set involved in the drive of FIG. 1, together with related axes and certain dimension lines;

FIG. 3 provides a plan view of the transmission-plate and roller set also involved in the drive of FIG. 1, together with related axes and certain dimension lines;

DESCRIPTION OF THE PREFERRED EMBODIMENTS

Figure 5:
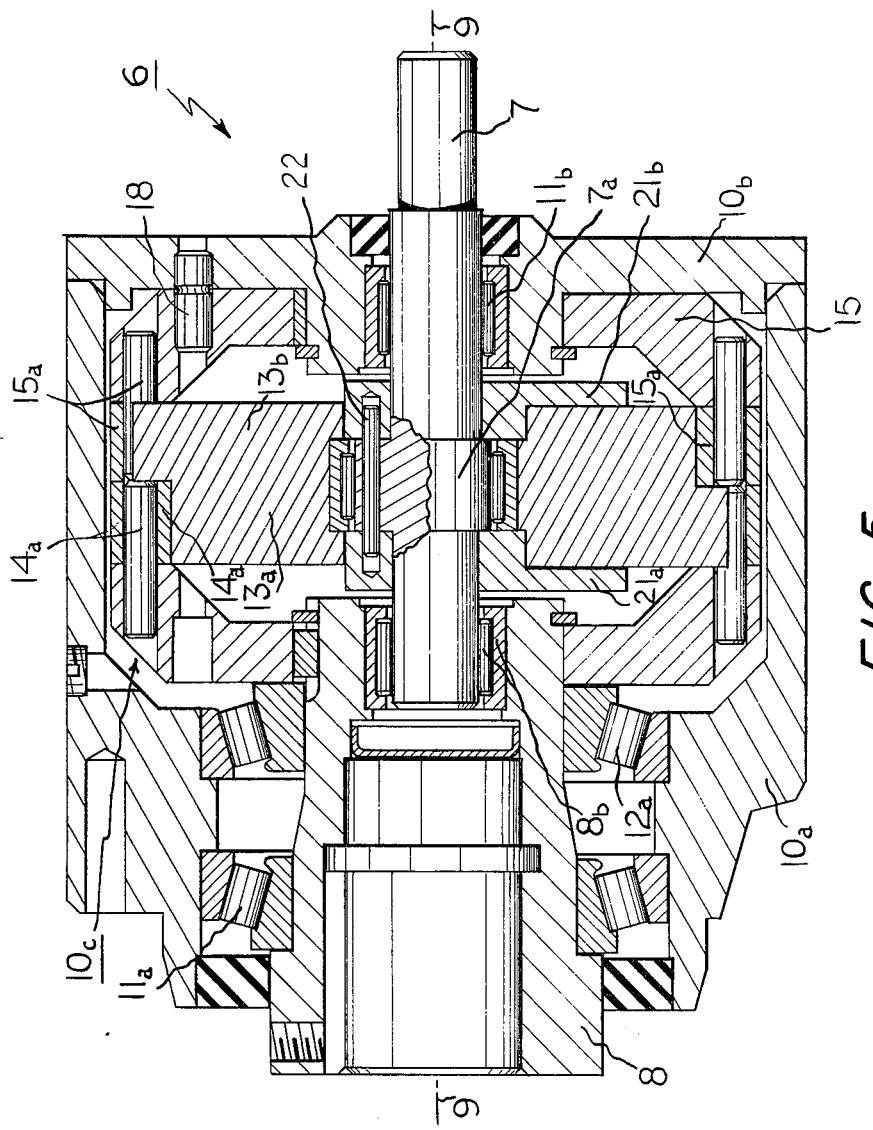
FIG. 5 is a transverse cross-section of a single-stage drive corresponding generally to that shown in FIG. 1.

The mechanical drive arrangement 6 appearing in FIGS. 1 and 5 is of a construction wherein an input shaft 7 is intended to be turned at a relatively high speed by a power source outside one end of a two-part housing and to effect the precisely-ratioed lower-speed rotation of an output shaft 8 disposed collinearly with it along an axis 9—9. Separable housing parts 10a and 10b are normally held together by suitable fasteners (not appearing in the drawings) and include bearing supports 11a and 12a for output shaft 8 and bearing support 11b for input shaft 7; a second bearing support, 8b, for the inner end of the input shaft 7 is disposed within the inner end of output shaft 8. Within the remaining cavity 10c defined within the joined housing parts are located two orbiting elements, 13a and 13b, which are preferably integral with one another but are shown in a spaced relation in FIG. 1. Element 13a is in the form of a planet gear having a number of lobe-like teeth following an epitrochoid curvature and disposed for cooperative meshed engagements with equally-spaced roller-type teeth 14a pinned to the sun-gear disk 14. The other half, 13b, of the orbiting elements, which serves as a transmission plate or cam, has a periphery which is substantially circular but interrupted by recesses 13c of substantially circular-segment form, the recesses embracing different rollers of a circular array of rollers 15a pinned to the disk 15. In accordance with known practices, the planet gear element 13a designed to have one less tooth than its cooperating encirclling sun gear 14, such that the gear 13a has one less convex lobe 13d than there are a predetermined maximum number of rollers 14a pinned to disk 14. Centers of sun gear disk 14 and disk 15 coincide with axis 9—9, whereas the centers of both planet gear element 13a and transmission plate 13b lie along an axis 16—16 which is eccentric in relation to axis 9—9 by an amount appropriate for the desired condition of rolling contact to appear between all the rollers 14a and planet gear 13a. The latter eccentricity is established by an eccentric circular cam shoulder 7a integral with input shaft 7, the orbiting elements 13a and 13b being mounted thereon with a common eccentricity via a bearing 17 which admits of their angular motion relative to that cam shoulder. Disk 15 is angularly restrained, as by a lock pin 18 (FIG. 5) secured with it and with the normally relatively-stationary housing part 10b.

Rotation of the input shaft 7 causes the united elements 13a and 13b to orbit eccentrically about axis 9—9, to an extent determined by the displacement between that axis and axis 16—16. However, the output sun-disk 14, and the output shaft 8 connected with it, will not be rotated unless the mated planet-gear element 13a is prevented from rotating angularly while at the same time being allowed to gyrate or orbit. If, on the other hand, that angular rotation is restrained, then the orbiting lobed planet element 13a will interact with the rollers 14a by forcing them to move angularly about axis 9—9, as desired. That angular rotation is at a reduced rate which is governed by the number of planet-element lobes 13d; each time the input shaft turns one full revolution, the output disk and output shaft are turned by an angle equal to the angular span of adjacent lobes.

Needed restraint as referred to above is achieved by way of the orbiting element 13b, which is integral with element 13a and which is so disposed relative to rollers 15a that mechanical interference develops with them. The latter rollers are held fixed in relation to the housing because of their pinning to disk 15 and the staking of that disk to housing part 10b. Element 13b is free to orbit as the eccentric 7a turns and promotes that result; however, other angular motion is prevented by cooperative engagements between rollers 15a and circular inner surfaces defining inner peripheral recesses 13c. Quite remarkably, the paired elements 13a and 13b will orbit or gyrate without actually turning angularly about the input axis, as the input shaft is turned, and yet the output shaft will in turn be rotated angularly about the same axis. The latter turning occurs as element 13a is orbited and its lobes 13d concomitantly urge the output rollers 14a in one angular direction.

If one instead reverses the positions of orbiting elements 13a and 13b, with the members and spacings of rollers 14a and 15a accommodating that reversal, then the operation is somewhat different, because the elements 13a and 13b will turn angularly, as well as orbit. In that reversed condition of operation, rotation of the input shaft eccentric will, again cause the elements 13a and 13b to orbit; however, lobes 13d would then interact with the relatively stationary rollers 15a and would thereby cause the elements 13a and 13b to be rotated angularly about the input axis at the same time. That angular rotation will then be imparted to the output shaft by way of the array of rollers 14a which are moved by the peripherally-recessed transmission disk 13b. The latter translation of motion effectively eliminates or cancels the orbiting, leaving only the desired low-speed angular movements as seen by the output shaft.

Preferably, the two sets or arrays of rollers, 14a and 15a, involve rollers having the same diameter, 19 (FIGS. 2 and 3), and spaced at one common radial distance, 20, from the central axis 9—9 of the device. They are also advantageously made different in number in the two arrays, so that the two orbiting elements 13a and 13b can be reversed in position with a corresponding change being effected in the ratio of relative angular velocities. The designer must in that situation select and distribute rollers so that both sets will fit and interact with either lobes of element 13a or peripheral recesses of element 13b, or vice versa.

As is shown in FIG. 3, the transmission plate or cam 13b engages certain of the rollers 15a, and it will of course be understood that it is the side engagements which effect needed angular coupling between the rollers 15a and recesses 13c, while contacts radially inwardly or outwardly are relatively unimportant. For that reason, the recesses 13c can be and advantageously are left open, and, when some of the rollers are "outside" those recesses and do not engage the plate 13b, there is nevertheless no loss of needed effects in operation of the mechanism. Yet, in relation to certain prior uses of fully circular holes within the boundaries of orbiting members, for purposes of transmitting only rotation, the open peripheral recesses 13c represent significant improvement, and especially in the type of drive structure under discussion here. In particular, one can in my improved devices locate the rollers, or pins, at a greater "moment arm" or radial distance from a center of turning than would be the case with internal-hole cams; that of course provides a bettered mechanical advantage. Or, for like reasons, one may use smaller-diameter cams and thereby reduce overall size of a device if the cams do not have to be large for the purpose of accommodating "inside" full circular holes. Lubrication is also more effective at the greater radial distances, because the centrifugal forces are heightened there, and peripheral open recesses thus promote benefit in lubrication as well. One of the major advantages in relation to a closed-hole transmission is found when drives are sought to be made for operation with great precision. In those instances, the holes and centers of cooperating pins must be fashioned and located with special accuracy, else there can be serious binding of pins in the holes, with consequent impaired operation. However, the present peripheral open-hole arrangement avoids such binding, inasmuch as any such inaccuracy tends to result in clearance between roller and recess, with backlog merely being increased.

Figure 4:
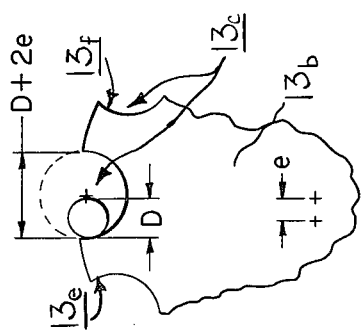
FIG. 4 represents a fragment of a transmission plate and a cooperating roller, together with designations of eccentricity and diameter relationships.

FIG. 4 illustrates the peripheral-recess and roller relationships which are to be maintained in a drive of optimum construction. As shown, each recess, 13c, should have substantially circular arcs following a prescribed curve along its inner periphery at least near the "sides" 13e and 13f, where the surfaces are most nearly radial in relation to the center of the transmission plate 13b. The balance of that inner periphery must not extend within that curve, but may lie outside of it, and the preferred construction involves but one curvature defined by a single circle of a diameter $D + 2e$, where $D$ is the outside diameter of cooperating rollers or pins such as 15a, and where $e$ is the eccentricity between the associated shaft and the shaft eccentric, such as shaft 7 and its eccentric 7a. Preferably, the open recesses 13c are somewhat larger than semicircular, as shown in FIG. 3, for example, to optimize the torque-handling effects occurring mainly along the aforementioned "sides".

Because of the substantial physical identity which can exist among the orbiting elements which can be used in the assembly, substantially the same dynamic mass unbalance may appear from their orbital movements, and effects of the eccentricities of many such elements may therefore be quite satisfactorily counterbalanced by one counterweighting such as that constituted by the two counterweight halves 21a and 21b (FIGS. 1 and 5) which are fastened together and with input shaft 7 by way of a pin 22. The same counterweighting may also be caused to serve the two orbiting gear elements of a two-stage orbital speed changer such as is disclosed in my said copending U.S. patent application Ser. No. 530,224, whereby the same basic assembly becomes effective over a fuller range of possible speed changes.

In the preferred "gearing" arrangements which have been illustrated, the lobe-like teeth 13d follow a continuous substantially epitrochoid curvature fully about the periphery of a "planet" element, such as 13a and the cooperating surrounding sun-gear element 14 has one more "tooth", formed by the cylindrical bodies 14a. Transmission plate or cam 13b may be thought of as a "zero-velocity" element because it will either have no velocity relative to the housing, as in the embodiment depicted, or no velocity relative to the output shaft if the orbiting elements are reversed in position.

One may in modified constructions fashion the planet and transmission-plate elements separately, and then fasten them together in desired combinations, rather than making them integral. In other embodiments, the device may function as a differential, or may involve movements and/or restraint of various parts of the device relative to others to secure known types of motion-translating results. Cylindrical-surfaced equivalents of the described pins and rollers may also be exploited, and in another alternative the open peripheral recesses may be internal of an outer member rather than external of an inner member. Accordingly, it should be understood that the specific practices and preferred embodiments herein referred to have been offered by way of disclosure rather than limitations, and that various modifications, additions, and substitutions, may be effected by those skilled in the art without departure from these teachings; it is therefore aimed in the appended claims to embrace all such variations as fall within the true spirit and scope of this invention.

What I claim as new and desire to secure by Letters Patent of the United States is:

1. An orbital drive mechanism comprising two orbiting elements, one of which has peripheral surfaces acting as gear teeth and the other of which has peripheral open recesses which promote angular coupling isolated from orbital motion, means supporting said two elements for movements together eccentrically about an axis, two non-orbiting elements concentric with said axis, one of said non-orbiting elements being nested with said one of said orbiting elements and having peripheral surfaces acting as gear teeth which differ in number from the number of said gear teeth of said one of said orbiting elements, the other of said non-orbiting elements having peripheral surfaces of substantially circular curvature disposed within said peripheral open recesses of said other of said orbiting elements, margins of said peripheral open recesses being shaped substantially as arcs of a circle having a diameter equal substantially to the diameter of said circular curvature plus twice the eccentricity of said orbiting elements about said axis, and means restraining one of said non-orbiting elements from following angular movements of the orbiting element meshed therewith.

2. An orbital drive mechanism as set forth in claim 1 wherein said peripheral open recesses are on the exterior of said other of said orbiting elements, and wherein said surfaces of said other of said non-orbiting elements are substantially cylindrical and are disposed at a plurality of angular positions about and parallel with said axis.

3. An orbital drive mechanism as set forth in claim 2 wherein said other of said orbiting elements has a substantially circular outline externally interrupted by a plurality of said open recesses extending radially inward, and wherein said open recesses are alike and each has the outline of substantially a circular seqment, and wherein said cylindrical surfaces of said other of said non-orbiting elements are surfaces of separate cylindrical bodies disposed for engagements with said other of said orbiting elements within said open recesses.

4. An orbital drive mechanism as set forth in claim 3 wherein said cylindrical bodies are at the same fixed radial distance from said axis, wherein said surfaces of said one of said non-orbiting elements acting as gear teeth are surfaces of a plurality of separate cylindrical bodies at the same fixed radial distance from said axis, and wherein said surfaces acting as said gear teeth of said one of said orbiting elements are in the form of lobes having a continuous curvature and following a continuous substantially epitrochoid curvature fully about the outer periphery of said one of said orbiting elements and disposed to develop substantially-continuous rolling-contact relationships with all of said cylindrical bodies of said one of said non-orbiting elements at all times.

5. An orbital drive mechanism as set forth in claim 4 further comprising housing means forming an enclosure for internal parts of said mechanism, bearing means for supporting a shaft for rotation relative to said enclosure, crankshaft means supporting said orbiting elements within said enclosure for said movements eccentrically about said axis, said one of said non-orbiting elements comprising a sun gear fitting in surrounding relation to said one of said orbiting elements as a planet gear internal thereof, said lobes being of a number one less than the number of said cylindrical bodies of said one of said non-orbiting elements, said cylindrical bodies comprising rollers, and said rollers of both of said non-orbiting elements being of substantially the same diameter and disposed at substantially the same radial distance from said axis.

6. An orbital drive mechanism comprising an orbital element having epitrochoidal gear teeth and surfaces of substantially circular curvature which promote angular coupling isolated from orbital motion the center of said cylindrical recesses being on a diameter equal to or greater than the mean diameter of the peripheral gear teeth on said orbiting element, means supporting said orbital element for movement eccentrically about an axis, and two non-orbiting elements concentric with said axis, one of said non-orbiting elements being nested with said gear teeth and having surfaces acting as gear teeth which differ in number from the number of gear teeth of said orbiting element, the other of said non-oribiting elements having surfaces of substantially circular curvature meshed with said surfaces of said orbiting element, the circular surfaces of said orbiting element being shaped substantially as arcs of a circle of less than 360° with diameters equal substantially to the diameters of the surfaces of the other said non-orbiting element plus twice the eccentricity of said orbiting element about said axis.

7. The orbital drive mechanism as set forth in claim 6 and further including means facilitating moving said orbiting element eccentrically about said axis.

8. The orbital drive mechanism as set forth in claim 6 and further including means restraining one of said non-orbiting elements from following angular movements of the orbiting element meshed therewith.

9. An orbital drive mechanism comprising an orbiting element having peripheral epitrochoidal gear teeth, means supporting said orbiting element for movement eccentrically about an axis, and two non-orbiting elements concentric with said axis, the first of said two non-orbiting elements being nested with said gear teeth and having surfaces acting as gear teeth which differ in number from the number of gear teeth of said orbiting element, a set of laterally extending cylindrical pins which promote angular coupling isolated from orbital motion on one of said orbiting element and the second said non-orbiting element and a set of cylindrical recesses on the other of said orbiting element and the second said non-orbiting element, said cylindrical recesses meshing with said pins, the diameter of said recesses being equal substantially to the diameter of the pins plus twice the eccentricity of said orbiting element about said axis.

* * * * *